March 30, 1937.   J. J. GALLIGAN ET AL   2,075,189
CRINKLED RUBBER AND METHOD OF MAKING
Filed Oct. 24, 1935

INVENTORS
JAMES J. GALLIGAN
WILLIAM J. ROBINSON
BY
ATTORNEY.

Patented Mar. 30, 1937

2,075,189

UNITED STATES PATENT OFFICE 2,075,189

CRINKLED RUBBER AND METHOD OF MAKING

James J. Galligan and William J. Robinson, Providence, R. I., assignors to United States Rubber Products Inc., New York, N. Y., a corporation of Delaware Application October 24, 1935, Serial No. 46,469

15 Claims. (Cl. 154—33)

This invention relates to a crinkled rubber sheet material and the method of making the same, and more particularly to a crinkled rubber having a highly irregular surface.

The use of crinkled rubber, either single or multi-ply, has become very extensive in the last few years for the making of bathing suits, bathing caps, shoes, aprons and other articles. In particular, the manufacture of bathing suits and other articles of bathing wear from such material has increased by leaps and bounds, and such articles are now standard in rubber manufacture. These suits and other articles made from the crinkled rubber have attained their popularity because of lightness, water shedding properties, snug fit wet or dry, and highly attractive appearance with large variety in design and color. However, there are certain disadvantages connected with the majority of the rubber bathing suits at present being made. One disadvantage is that in general these suits have been made from calendered sheet rubber which necessarily is produced from masticated rubber. As a result, such rubber is lacking in the tensile strength possessed by rubber laid down directly from latex, and in addition in the calendering process rubber acquires a grain so that it will tear more readily in a direction with the grain than across the grain. Hence the suits previously made of calendered rubber will tear very easily upon being punctured.

A further difficulty is that the general practice is to vulcanize the calendered rubber suits by means of sulphur chloride, usually applied in the form of a dilute vapor. It is, of course, possible to vulcanize the crinkled material by the use of a high powered accelerator capable of vulcanizing at relatively low temperatures, but the use of such accelerators with usual procedure entails considerable difficulty in pre-vulcanization of the rubber during calendering and milling and also during storage. If the ordinary heat cure at elevated temperatures is used, the calendered rubber, by reason of its previous mastication, quickly softens under the heat before it can be set by vulcanization, and as a result the rubber distorts so that it is not practical to vulcanize such crinkled rubber by the usual heat cure. For this reason the sulphur chloride cure is commonly used because the action of the sulphur chloride is so powerful that vulcanization can be carried out at only slightly raised temperatures just sufficient to volatilize the sulphur chloride.

A great disadvantage in the use of sulphur chloride for vulcanization is that it is difficult in practice to produce a vulcanized article of good ageing properties and durability, either by reason of overvulcanization from excess of the sulphur chloride, or by the action of its decomposition products on the rubber.

The rubber bathing article business is also highly competitive, and therefore it is essential in order to get business that new and striking designs, both in the article and in the material composing it, be continually brought out.

An object of the present invention is to provide a crinkled rubber material of highly ornamental and striking appearance.

Another object is to provide a crinkled rubber material of greater tear strength, and one in which the tear strength with and across the length of the material is more uniform.

Still another object is to provide a crinkled rubber material of better ageing properties and durability.

A further object is to provide a process for making crinkled rubber material having the desired above named properties.

Further objects will appear from the detailed description and drawing, in which latter:

Figure 1:
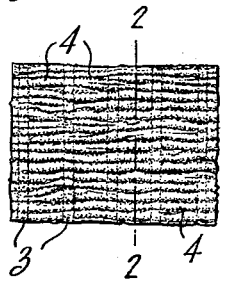
Fig. 1 is a top plan view of the crinkled material of the present invention at an intermediate stage.

The use of the method of the invention in producing one specific embodiment of the crinkled rubber material will first be described.

Two superposed plies of rubber, one of which is under tension and longitudinally stretched, are passed between a pair of even speed pressure rolls, one of which is provided with relatively small or narrow projections in a desired pattern, which projections cooperate with the second roll to press together into adhesive contact small portions of the two plies of rubber so that relatively closely spaced small areas of the superposed plies will be united in a pattern similar to that of the projections on the pressure roll. The roll cooperating with the roll having projections may be smooth, or instead it may be provided with mating projections similar to those on the other roll. The rolls will be spaced apart, depending upon the combined thickness of the two plies of rubber, to a degree sufficient to provide the desired uniting pressure without undesirably thinning the rubber of the joined areas. Either the stretched ply or the unstretched ply may be the one which is in contact with the roll having the projections, but ordinarily it is preferred to have the stretched ply in contact with the roll having the projections, if only one roll is so provided. By varying the form of the projections, their spacing, area and arrangement, a wide variety of crinkled patterns may be obtained in the united material, and the pattern may also be varied to a considerable extent by varying the thickness and character of the rubber stocks, the tension at which the stretched ply is supplied, the pressure of the uniting rolls, and other variables. In the specific embodiment illustrated in the drawing, the crinkled material is made by the use of a smooth roll and a cooperating roll having projections in the form of relatively closely spaced circumferential narrow ridges having blunt pressure faces. Upon issuance of the joined plies from the rolls, the tension on the stretched ply is relaxed, and as a result this ply contracts in length and also slightly expands in width. Since the unstretched ply cannot thus contract and is united to the previously stretched backing ply along the pressure areas, it is drawn up from a longitudinal direction in puckers or crinkles. In the specific embodiment shown, (Figs. 1 and 2), the top or crinkled ply is designated by the numeral 1, while the stretched or backing ply is designated by numeral 2. At 3 there appear narrow parallel joint lines at the points where the two plies have been united by the pressure. Between each adjoining pair of joint lines the free portions of the unstretched ply are formed into small transverse puckers 4. These puckers vary considerably in height, width, size and shape, but the general effect is that of a series of laterally extending small puckers between each adjoining pair of longitudinal joint lines. The present invention is not particularly concerned with the action on the bottom or backing ply. However, this in general will appear to have slight parallel depressions at the joint lines 3, and, depending upon the thickness and tensile strength of the backing sheet, the joining pressure, and the tension placed upon the ply, it may under certain circumstances be formed into puckers.

The process steps and resulting product thus above described are in general the same as those disposed in our copending application Serial No. 29,416, filed July 1, 1935, which issued December 3, 1935, as Patent No. 2,022,852. However, in the present process a succeeding step involves stretching the above composite or two ply crinkled material very highly in a lateral direction, the tension being sufficient to stretch the top crinkled ply beyond its elastic limit, but the stretch remaining within the elastic limit of the bottom or backing ply. In order to accomplish this result, it is essential that the backing ply 2 be composed of a rubber stock of much greater tensile strength than the top ply, and it is preferred for this purpose to use a backing ply of rubber deposited directly from latex and a top ply of masticated and calendered rubber.

As an alternative, however, the backing may be made of a thicker and/or partly vulcanized ply of masticated rubber, the essential being as before to provide a backing ply which will not be stretched beyond its elastic limit in the succeeding stretching step. The relative thickness of the two plies may be considerably varied in practice, depending upon the effects desired and the nature of the stocks, but when using a masticated rubber top ply with a backing ply of rubber deposited directly from latex a suitable thickness for the top ply is .004 to .0075 in., and for the bottom ply .008 to .012 in.

Figure 2:
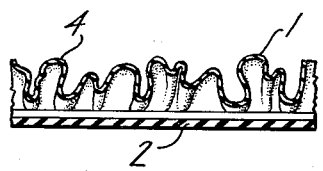
Fig. 2 is an enlarged section on the line 2—2 of Fig. 1.
Figure 3:
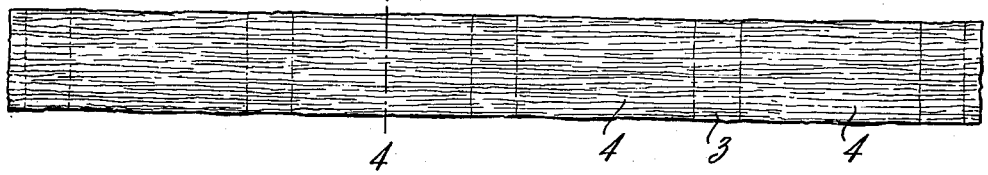
Fig. 3 is a more or less diagrammatic plan view illustrating the material of Fig. 1 when laterally stretched.
Figure 4:
Fig. 4 is an enlarged section on the line 4—4 of Fig. 3.

In Fig. 3 there is shown more or less diagrammatically the material of Fig. 1 when stretched laterally in the succeeding step. This stretching may be accomplished by any suitable tentering or stretching device, either hand or machine operated. If desired the stretching may be to a point as high as eight times the original width, but for most purposes a stretch of about six times the original width has been found suitable. Since the unvulcanized top or masticated rubber ply is stretched beyond its elastic limit, the rubber in its crinkles 4 is necessarily permanently thinned out and extended laterally so that when the lateral tension on the composite sheet is released the superficial area of masticated rubber in any crinkle or given crinkled portion, when spread flat, will be much greater with respect to the corresponding portion of the backing ply, than in the case of the material of Fig. 1. This greater area is of course due to the flattened portion having a greater length from its original longitudinal crinkling, and a greater width by reason of being laterally stretched beyond its elastic limit. As a result, when the backing ply laterally contracts, the crinkles of the top ply of masticated rubber are drawn up from a lateral direction, and since as above stated their superficial area is much greater than before, the contracting effect of the backing ply causes the crinkles to assume a highly irregular and distorted form between the joint lines. Two or more adjoining crinkles in a series located between adjacent joint lines may run together in a single crinkle of greater height, and this crinkle may have a sharp peak or it may have a flattened top. In some cases the top of the crinkle may buckle inwardly again, that is, in a reverse direction to the puckering or crinkling of the main body of the crinkle. Two or more adjoining crinkles may develop sharp peaks adjacent one of the joint lines, while immediately succeeding crinkles in the same row may develop sharp peaks at their opposite ends, that is, near the next adjoining joint line. Some of the crinkles may distort or twist more or less spirally. In general, the maximum height of a row of crinkles is much greater than in the case of the material of Fig. 1, that is, prior to its lateral stretching. Also the increase in maximum height of the crinkles brings out more sharply the valleys existing between adjacent rows of crinkles at the areas where the two plies are joined together. The general effect is highly ornamental and striking, a certain regularity being produced by the uniformly recurring joint areas but at the same time a highly irregular effect being produced by the great variation in the size, shape, height, twist and direction of inclination of the individual crinkles. In fact, the appearance might be briefly even if contradictorily described as an "irregular regularity", and is somewhat similar to that of a rough Turkish toweling.

Figure 5:
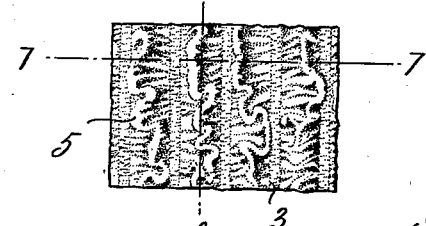
Fig. 5 is a plan view of an embodiment of the finished crinkled material of the present invention.
Figure 6:
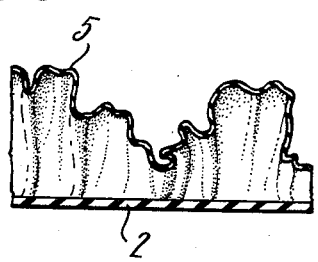
Fig. 6 is an enlarged section on the line 6—6 of Fig. 5.
Figure 7:
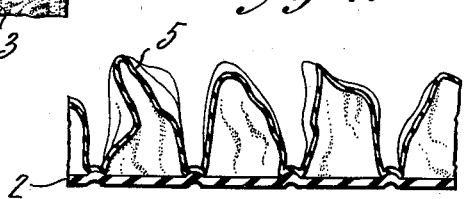
Fig. 7 is an enlarged section on the line 7—7 of Fig. 5.

In Fig. 5 there is shown a plan view of the material after relaxation from the lateral stretching, and it illustrates as well as it is possible in a drawing the great irregularity of the crinkles 5.

The material as above described is but a single embodiment of the invention, and it will be obvious that by varying the size, shape, spacing and arrangement of the projections on the pressure rolls, the thickness of the stocks, the pressure applied, the original longitudinal tensioning of the backing ply, the lateral tensioning of the composite material, and other variables, an enormous variety of striking and ornamental designs may be produced.

The material may be vulcanized in sheet form if desired and then made up into articles, or instead the unvulcanized material may be cut up and made into articles which are then vulcanized. If desired, vulcanization can be accomplished by the use of a sulphur chloride cure, using a tumbling machine, or instead it may be accomplished at low temperatures by the use of high powered accelerators; or, due to the use of latex rubber in the backing ply, it may also be accomplished at a higher heat with the use of accelerators of less power. This last method of vulcanization may be carried out by reason of the fact that the backing ply is of rubber deposited directly from latex. Such rubber by reason of its not being milled or masticated, has a much higher tensile strength in the unvulcanized condition than masticated rubber and it does not soften so easily under heat. As a result the backing of latex rubber will retain the shape of the article during the heat of vulcanization long enough for sufficient vulcanization to take place to set the material. Hence the material or articles made from it may be vulcanized by the ordinary dry heat cure, with the articles hung up, placed on forms or laid flat, without sagging or distortion during the cure. There may also be employed the diffusion method of low temperature vulcanization disclosed in patent to Cadwell, No. 1,777,960, dated Oct. 7, 1930.

Rubber deposited directly from latex is without grain, and as stated above it has a high tensile and tear strength as compared with masticated rubber, and in addition its tensile strength is uniform in all directions so that there is no preferential direction of tear when the rubber is punctured. By reason of the use of latex rubber for a backing sheet, the bathing suits or other articles made from the crinkled material have greater strength so that they do not tear or puncture as readily, and when punctured, there is no increased tendency to rip in any one direction.

While a specific embodiment of the invention has been shown and described, it is obvious that numerous variations may be made in it and it is not desired to limit the invention otherwise than as set forth in the appended claims.

Having thus described our invention, what we claim and desire to protect by Letters Patent is:

1. The method of making a crinkled elastic sheet material which comprises superposing at least two plies of rubber or like material, uniting said plies on closely spaced areas while maintaining one ply stretched in one direction, and then relaxing the composite sheet to thereby crinkle one side, subsequently stretching it in a direction at an angle to that of the first stretching and again relaxing the sheet to thereby increase the variation in height of the individual crinkles.

2. The method of making a crinkled elastic sheet material which comprises stretching a ply of unvulcanized rubber or like material, superposing a second ply thereon, uniting the plies by pressure on closely spaced areas and then relaxing the composite material to thereby crinkle one side, stretching the composite material in a direction laterally of the first stretching and again relaxing the material to thereby increase and render more irregular the original crinkling, and setting the material to thereby maintain a permanent crinkled form when in a relaxed condition.

3. The method of making a crinkled elastic sheet material which comprises associating in superposed relation at least two plies of rubber, one of said plies being of greater tensile strength and in a stretched condition, uniting said plies on closely spaced areas and then relaxing the composite sheet to thereby crinkle one side, stretching the composite sheet in a direction laterally of the first stretching and to a point beyond the elastic limit of the ply of less tensile strength, and again relaxing the composite sheet.

4. The method of making a crinkled elastic sheet material which comprises associating in superposed relation at least two plies of rubber, one of said plies being of rubber deposited directly from latex and a second being of masticated rubber, the first ply being in a stretched condition, uniting the plies along closely spaced areas and then relaxing the composite sheet to thereby crinkle one side, stretching the composite sheet in a direction laterally of the first stretching and to a point beyond the elastic limit of the said masticated rubber ply, and again relaxing the composite sheet to thereby produce relatively sharp peaks in the original crinkles.

5. The method of making a crinkled elastic sheet material which comprises associating in superposed relation at least two plies of rubber, one of said plies having a higher tensile strength than the second by reason of a difference in degree of vulcanization, and being in a stretched condition, uniting the plies by pressure on closely spaced areas and then relaxing the composite sheet to thereby crinkle one side, stretching the composite sheet in a direction laterally of the first stretching and to a point beyond the elastic limit of the ply of less tensile strength, and again relaxing the composite sheet to thereby increase the superficial area of the original crinkles.

6. The method of making a crinkled elastic sheet material which comprises feeding a ply of rubber between even speed rolls having closely distributed small cooperating pressure areas, simultaneously feeding between said rolls a second ply of rubber of greater tensile strength and in a stretched condition, to thereby unite said plies at said pressure areas, relaxing the composite sheet after passage through said rolls to thereby form crinkles of irregular height on one side of said sheet, stretching the composite sheet in a direction laterally of the first stretching and to a point beyond the elastic limit of said first ply, and again relaxing the composite sheet to thereby increase the irregularity in height of said crinkles.

7. The method of making a crinkled elastic sheet material which comprises superposing two plies of rubber stock of unequal tensile strength, one of which is stretched, joining said plies along small relatively closely spaced areas arranged in a direction parallel to the direction of stretching, relaxing the stretched ply, stretching the combined material in a direction angular to that of the first stretching and to a point beyond the elastic limit of the ply of less tensile strength, and relaxing the combined material.

8. The method of making a crinkled elastic sheet material which comprises feeding a ply of rubber between rolls one of which is provided with spaced circumferential ridges, simultaneously feeding between said rolls a second ply of rubber of greater tensile strength and in a stretched condition, to thereby unite said plies along the bearing areas of said ridges, relaxing the composite sheet after passage through said rolls to thereby form series of laterally extending small crinkles, stretching the composite sheet laterally of the first stretching and to a point beyond the elastic limit of said first ply, and again relaxing the composite sheet to thereby change the shape of a substantial portion of said laterally extending crinkles.

9. A composite crinkled elastic sheet material comprising on one side a ply of rubber or like material crinkled in a regularly recurring arrangement of irregular small hollow crinkles, the crinkles being puckered or drawn up into relatively sharp peaks from a plurality of directions, and comprising on the other side a ply of rubber or like material.

10. A composite elastic sheet material comprising a ply of rubber or like material, a second ply of rubber or like material united thereto at a plurality of closely spaced regularly recurring small areas disposed over its entire extent, one of said plies having small hollow crinkles or puckers disposed over its unconnected or free portions, the individual crinkles being highly irregular in form, size and height and contracted or drawn up from two directions.

11. A composite crinkled elastic sheet material comprising a plurality of plies of rubber or like material united at relatively closely spaced small areas over their entire extent, the free intermediate portions of at least one ply being drawn up and distorted from different directions into closely spaced small puckers or crinkles.

12. A composite crinkled elastic sheet material comprising a ply of masticated rubber and a ply of rubber deposited directly from latex, said plies being united at relatively closely spaced small areas over their entire extent, the free intermediate portions of the masticated rubber ply being drawn up from different directions into highly irregular relatively sharply peaked crinkles or puckers, a part at least of such crinkling being effected by stretching of the joined masticated rubber ply beyond its elastic limit.

13. A composite crinkled elastic sheet material comprising a ply of masticated rubber and a ply of rubber deposited directly from latex, said plies being united at relatively closely spaced small areas over their entire extent, the free intermediate portions of the masticated rubber ply being drawn up from opposite directions into highly irregular crinkles or puckers, and in any given crinkled area of the composite material the crinkles of the masticated rubber ply when flattened having a length and width considerably greater than that of the underlying latex rubber ply in the same area.

14. A composite crinkled elastic sheet material comprising a ply of masticated rubber and a ply of rubber deposited directly from latex, said plies being united at relatively closely spaced small areas arranged in a definite pattern over their entire extent, the free intermediate portions of the masticated rubber ply being drawn up from opposed directions into highly irregular twisted and distorted crinkles or puckers of highly irregular height and direction and forming relatively deep valleys at the joint areas between them.

15. A composite crinkled elastic sheet material comprising a ply of masticated rubber and a ply of rubber of appreciably greater tensile strength, said plies being united along relatively closely spaced parallel narrow joint lines, the intermediate free portions of said first ply being drawn up from directions parallel and transverse to said joint lines into rows of highly irregular and distorted crinkles or puckers extending in different directions.

JAMES J. GALLIGAN.
WILLIAM J. ROBINSON.